SUBSCRIPTION TELEVISION CODE DETERMINING ARRANGEMENT
Filed Dec. 6, 1955
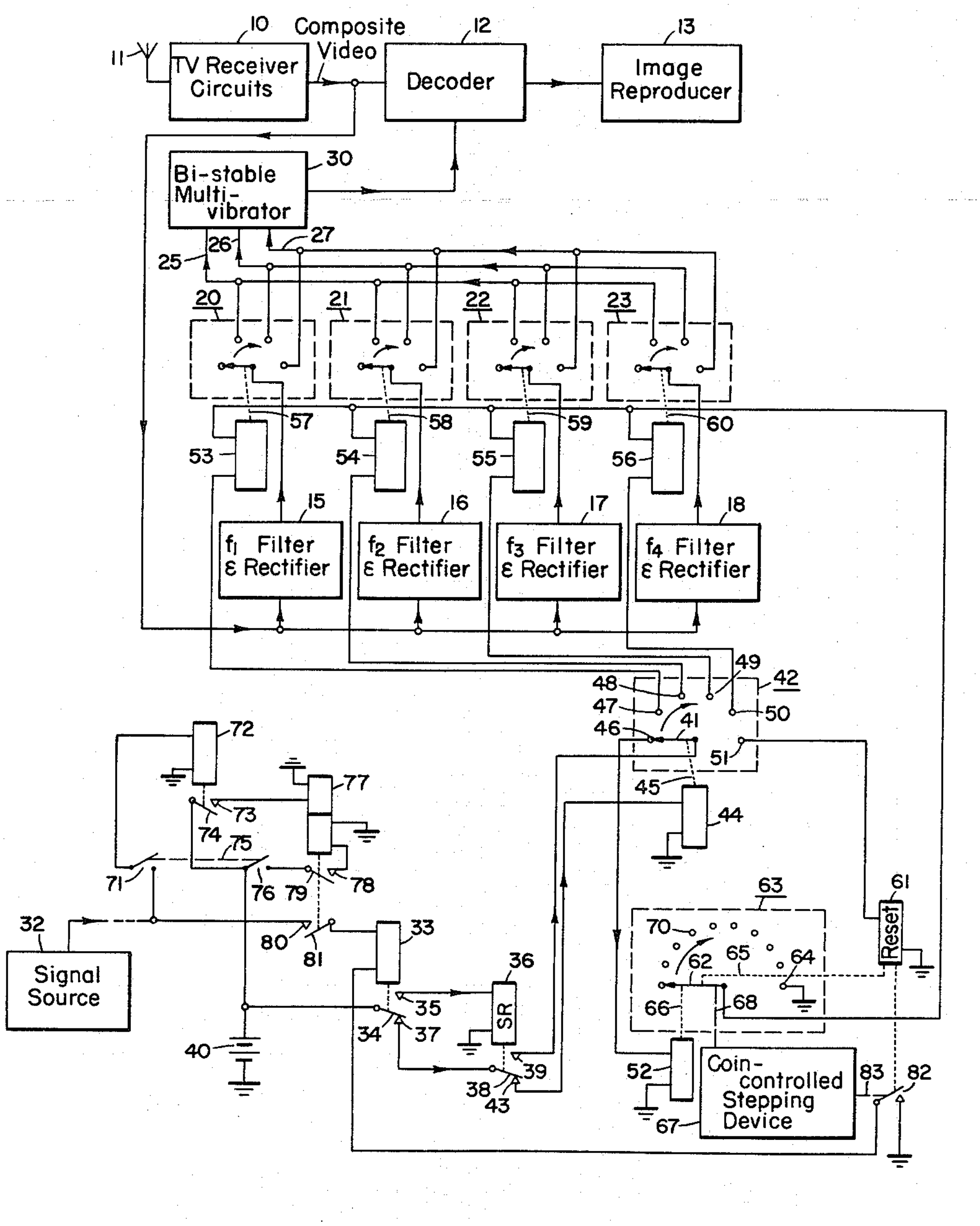
ALEXANDER ELLETT
*INVENTOR.*
BY John J. Pederson
HIS ATTORNEY.

United States Patent Office 2,866,962

Patented Dec. 30, 1958

2,866,962

SUBSCRIPTION TELEVISION CODE DETERMINING ARRANGEMENT

Alexander Ellett, River Forest, Ill., assignor to Zenith Radio Corporation, a corporation of Delaware Application December 6, 1955, Serial No. 551,255

5 Claims. (Cl. 340—147)

This invention relates to a code-determining arrangement for a subscription television system, that is, a system in which a television signal is transmitted in coded form to be utilized only in subscriber receivers having appropriate decoding apparatus actuated in accordance with the code schedule employed at the transmitter.

Subscription television systems have been proposed in which a television signal is coded according to a selected code schedule determined, at least in part, by a plurality of code-determining elements individually having a plurality of operating positions and collectively representing a prescribed code schedule in accordance with the instantaneous position of each of the elements with respect to the remaining elements. Arrangements of that general type are shown, for example, in copending applications Serial No. 270,557, filed February 8, 1952, in the name of George V. Morris, Serial No. 326,107, filed December 15, 1952, in the name of Jack E. Bridges, and Serial No. 268,966, filed January 30, 1952, in the name of Erwin M. Roschke, all of which are assigned to the present assignee. It is contemplated in those prior arrangements that each subscriber would be apprised of the positions required for the various code-determining elements for any given subscription program before the commencement of the program so that he could adjust the elements accordingly. Charges may, obviously, be assessed on the basis of the information made known to subscribers.

It may be desired to employ adjustable code-determining elements, as in the previous schemes, but arranged for manipulation on a cash or collection basis. In this way, payment for each subscription program becomes a condition precedent to its being viewed. In accordance with a preferred embodiment of the invention, the code-determining elements are controlled by an actuating mechanism which is normally ineffective or non-functionally associated with the elements it is to control. A conditioning device, responsive to "bits" of information, establishes the actuating mechanism in its active condition wherein a series of control signals transmitted from the subscription television central exchange or transmitter operates the device to adjust each individual code-determining element as required to decode a particular coded program signal. The subscriber may register one bit of information in the conditioning device by depositing a predetermined number of coins into a bank or coin box while another bit of information may be registered in response to a predetermined one of the received control signals.

It is, accordingly, an object of the present invention to provide an improved code-determining arrangement for a subscription television receiver.

It is another object of the invention to provide an adjustable code-determining mechanism characterized by the fact that adjustment thereof requires an initial registration of certain predetermined bits of information which may include the depositing of coins as prepayment for the program to be viewed.

A code-determining arrangement constructed in accordance with the present invention comprises a series of adjustable code-determining elements individually having a plurality of operating positions and collectively representing a code schedule in accordance with their respective positions. An actuating mechainsm is provided which includes a series of normally ineffective stepping relays each of which controls the positioning of an assigned one of the code-determining elements. A signal source is coupled to the stepping relays for providing a series of control signals of which selected ones represent a predetermined operating position of respective ones of the adjustable code-determining elements. A conditioning device for the actuating mechanism is provided having a plurality of operating positions and being conjointly responsive to the registration of at least two different items of information so related to one another that the conditioning device assumes a preselected one of its operating conditions in which it completes circuit means to render the stepping relays effective to permit the relays to respond to the control signals. Finally, the code-determining arrangement includes a plurality of means for individually registering an assigned one of the items of information on the conditioning device.

The features of this invention which are believed to be new are set forth with particularity in the appended claims. The invention, together with further objects and advantages thereof, may best be understood, however, by reference to the following description in conjunction with the accompanying drawing, in which the single figure illustrates a subscription television receiver including a code-determining arrangement constructed in accordance with the invention.

The code-determining arrangement is shown and hereinafter described as employed in the system disclosed in the aforementioned Bridges application, Serial No. 326,107. In that system, a coding signal comprising a combination of signal bursts individually having a predetermined identifying frequency is transmitted to the subscriber receivers along with the video signal during each field-retrace interval. The signal bursts are preferably randomly sequenced and randomly appearing within each combination and are derived from the video signal at the receiver by means of suitable filters and rectifiers. After separation from one another, they are available at the receiver for application to a series of code-determining elements in the form of multi-position switches just as they are applied to a like series of switches at the transmitter. This switching arrangement is employed in both locations to selectively establish particular circuit connections between a plurality of input circuits over which the rectified bursts are detected and a plurality of output circuits which lead to a multi-stable actuating device such as a bi-stable multivibrator. Accordingly, the bi-stable multivibrator is actuated in a prescribed sequence, shifting from one to the other of its two stable operating conditions as dictated by the combination of code signal bursts. The resulting amplitude changes in the output signal of the multivibrator are employed to effect mode changes in the television system by varying the relative timing of the video and synchronizing components of the television signal. In this manner, the operating mode is changed in an irregular or random fashion since the individual bursts appear randomly within the combinations of signal bursts.

The receiver, which may utilize a telecast originating at a transmitter constructed in accordance with the aforementioned disclosure by Bridges, comprises the usual radio-frequency amplifier, first detector, intermediate-frequency amplifier, second detector and video amplifier, all connected in cascade, shown in the drawing as one block 10 and designated "television receiver circuits." The input of unit 10, which is actually the input of the radio-frequency amplifier, is connected to an antenna circuit 11 and the output terminals of block 10, which are really the output terminals of the video amplifier, are connected through a decoder 12 to the input electrodes of a cathode-ray image-reproducing device 13.

Decoder 12 may be similar to that disclosed and claimed in copending application Serial No. 243,039, filed August 22, 1951, in the name of Robert Adler, and assigned to the present assignee. It may comprise a beam-deflection tube having a pair of output circuits which may be selectively coupled into the video channel as the electron beam thereof is deflected from one to the other of two segmental anodes in synchronism with mode changes of the transmitted signal. It is assumed that these mode changes take the form of variations in the timing of the video signal relative to the synchronizing signal of the received composite video signal. Consequently, the output circuit coupled to one anode segment includes a time delay network while the output connected to the other segment does not, and the timing variations are compensated, to effectively decode the television signal, as the beam of the deflection tube is switched between its anodes. This switching effect is accomplished by means of a beam-deflection control or actuating signal applied to decoder 12, as explained hereinafter.

The second detector included in block 10 is also coupled to a customary synchronizing-signal separator which, in turn, is coupled to the field- and line-sweep systems for synchronizing the field- and line-scans of reproducer 13 with the transmitter. However, such separation and sweep circuits have not been shown to avoid unduly encumbering the drawing.

In an illustrated embodiment of the Bridges system, the air-borne coding signal may comprise six bursts of six different signal frequencies individually transmitted between the line-drive pulses superimposed on the vertical blanking pulse following the equalizing pulses. To facilitate separting these signal bursts, the output terminals of unit 10 are also coupled to each one of a series of filter and rectifier circuits 15–18. Although the aforementioned Bridges application discloses a system wherein the coding information received during each field-retrace interval includes signal bursts of six possible frequencies, for the sake of simplicity only four filters and rectifiers have been shown to segregate only four of the different frequencies designated $f_1$–$f_4$. It is apparent that the illustrated receiver may be readily modified to include additional circuitry to respond to signal bursts of the two additional frequencies.

The output circuit of each of the filter and rectifier units 15–18 is connected to the movable switch contact of a respective one of a series of code-determining elements or switches 20–23. Each one of the switches has four different operating positions, including a "home" position, and has three stationary contacts each of which is connected to an assigned one of a series of output circuits 25–27. As shown, the movable switch elements of each one of switches 20–23 is positioned in its reference or "home" position. Each movable contact is actuated from one position to the next under the control of an assigned stepping relay, as will be explained hereinafter, such that in its first operating position the incoming circuit is connected to output circuit 25, in its second operating position the incoming circuit is connected to output circuit 26, and in its third operating position the input circuit is connected to output circuit 27.

Decoding can be accomplished only if the various interconnections from the filter and rectifier units to output circuits 25–27 are identical to the corresponding interconnections established by a similar switching mechanism interposed between a series of burst signal generators and a bi-stable multivibrator in the coding apparatus at the transmitter. Output conductors 25–27 from the code-determining elements are connected respectively to different input circuits of a similar bi-stable multivibrator 30 comprising two cross-coupled triodes. One preferred arrangement is to connect one of circuits 25–27 to the control grid of one of the triodes so that multivibrator 30 will be actuated to one of its two operating conditions in response to pulses applied to that conductor, to connect another of the conductors to the control grid of the other triode to actuate the multivibrator to the other of its operating conditions in response to pulses applied over that conductor, and to connect the third conductor to the control grid of each triode so that the multivibrator is actuated from its instantaneous condition, whichever one that may be, to its alternate condition in response to applied pulses over that third conductor. The output terminals of bi-stable multivibrator 30 are connected to the deflection-control elements of decoder 12 to provide an actuating or deflection-control signal therefor which has an amplitude excursion each time the multivibrator changes from one operating condition to the next.

The code-determining elements are adjusted by providing a signal source 32 at the subscription television central exchange or transmitter. It is contemplated that a series of pulse control signals, preceded by an initial "start" signal of a predetermined frequency and terminated by a "reset" pulse, will be produced in source 32 and repeated from time to time both before the commencement of each subscription television program and during the early stages of that program to permit the adjustment of each subscriber's code-determining elements whenever the subscriber tunes in. Source 32 is connected to each subscriber receiver by means of an air link, wire conductor, or in any other suitable manner. One terminal of a frequency-selective relay 72, which respons only to the "start" signals, is effectively coupled to source 32 through a manually operated, normally-open switch 71. The other terminal of relay 72 is grounded. Relay 72 actuates a movable contact 74 which is connected to the positive terminal of a potential source 40, the negative terminal of which is connected to ground.

When relay 72 is energized by a "start" signal, contact 74 engages a fixed contact 73 connected to one terminal of the upper winding of a two-winding relay 77, the other terminal of the upper winding being connected to ground. Relay 77, when energized, closes movable contact 79 to a fixed contact 78 which is connected to one terminal of the lower winding of relay 77. The other terminal of the lower winding is connected to ground. Contact 79 is connected through another manually operated, normally-open switch 76 to the positive terminal of source 40. Switch 76 is ganged for unicontrol operation with switch 71 as indicated by dashed construction line 75 so that both switches are closed at the same time. Switches 71 and 76 are operated by the subscriber and may take the form of a conventional double pole, single throw switch.

Relay 77 when energized also shifts a movable contact 81 to engage a fixed contact 80 which is also connected to source 32 by means of the air channel, wire conductor, etc. Contact 81 is connected to one terminal of a stepping relay 33, the other terminal of which is connected through a normally-open switch 82 to ground. Relay 33 actuates a movable contact 34 which is connected to the positive terminal of potential source 40. Movable contact 34 shifts between its make contact 35 which is connected to one terminal of a slow-to-release relay 36, the other terminal of which is grounded, and its break contact 37 which, in turn, is connected to a movable contact 38 controlled by relay 36. Contact 38 shifts between its make contact 39 which is connected to a movable contact 41 of a six-position switch 42, and its break contact 43 which is connected to one terminal of a stepping relay 44, the other terminal being connected to ground.

Stepping relay 44 controls the positioning of movable contact 41, as indicated by the dashed construction line 45, and therefore steps switch 42 from one position to the next. Switch 42 has six stationary contacts 46–51 individually corresponding to respective ones of its six operating positions. Movable contact 41 as shown is positioned in its "home" position in which it establishes an electrical connection to stationary contact 46 connected in turn to one side of a stepping relay 52, the other side of which is connected to ground. Stationary contacts 47–50 of switch 42 are respectively connected to one side of an assigned one of a series of stepping relays 53–56; relay 53 controls the positioning of switch 20 as shown by the dashed construction line 57, relay 54 controls the positioning of switch 21 as shown by the dashed line 58, relay 55 actuates switch 22 as shown by the dashed construction line 59, and stepping relay 56 effects step-by-step actuation of switch 23 as shown by the dashed construction line 60. Stationary contact 51 of switch 42 is connected to one side of a reset magnet or relay 61, the other side of which is grounded.

The other terminals of stepping relays 53–56 are connected together and to the movable contact 62 of a conditioning device which takes the form of a ten-position stepping switch 63. Conditioning device 63 has ten stationary contacts corresponding to its ten operating positions but only one of these contacts (the one designated 64) is electrically connected and it is connected to ground. All the others are electrically "free." Movable contact 62 is normally positioned in its "home" position as shown and thus must be stepped nine times to establish a connection with stationary contact 64. The movable contact conjointly responds to two different actuations. Stepping relay 52 effects step-by-step operation of switch 63 as shown by the dashed construction line 66 and a coin-controlled stepping device 67 also effects step-by-step movement of contact 62 as shown by dashed line 68. Unit 67 may take the form of a coin-actuated mechanism which in response to the depositing of each coin of a predetermined denomination, such as a quarter, effects a predetermined movement of a stepping mechanism. In this way, each time a quarter is inserted, stepping device 67 effects a movement of one step of movable contact 62. Additionally, each time a pulse is supplied to relay 52 movable contact 62 is also moved one step. Switch 82 is controlled by unit 67, as shown by dashed line 83, and closes in response to the depositing of the first coin. Reset magnet 61, when energized, rotates wiper contact 62 back to its "home" or reference condition as shown. This is illustrated schematically by dashed construction line 65.

More specifically, unit 67 may comprise a pair of contacts, located in or beneath a coin chute, that are closed momentarily each time a coin strikes one of them. A source of positive potential may be connected to one of the contacts and the other may be connected to the top or ungrounded terminal of stepping relay 52. Thus, each time the contacts are closed, which is in response to the depositing of each quarter, relay 52 is energized momentarily to effect actuation of movable wiper contact 62. The contacts of switch 82 may also be located in or below the coin chute so that they are closed when the first quarter is dropped in the chute. Switch 82 may be of the type that once it is triggered remains in a closed condition until it is actuated back to its normally-open condition. This reset operation may be controlled by reset magnet 61.

Inasmuch as a complete description of the coding technique is included in the copending Bridges application and since the coding technique itself forms no part of the present invention, the operation of the receiver will be described only briefly, disregarding for the moment the detailed operation of the apparatus for controlling the adjustment of code-determining switches 20–23. The coded television signal is intercepted by antenna 11, amplified in the radio-frequency amplifier, heterodyned to the selected intermediate frequency in the first detector, amplified in the intermediate-frequency amplifier, detected in the second detector to produce the composite video signal, and amplified in the video amplifier in unit 10 to produce a coded composite video signal. This signal is applied through decoder 12 to the input electrodes of image-reproducing device 13 to control the intensity of the electron beam thereof in well-known manner.

The field- and line-sweep systems (not shown) respond in conventional manner to the field- and line-synchronizing signals respectively to produce the proper vertical and horizontal deflection signals for image reproducer 13. Additionally, the sound modulated carrier wave normally received with the video carrier is detected and reproduced in an appropriate audio system which has also been omitted from the drawing for purposes of simplicity.

The composite video signal from the video amplifier in block 10 is applied to the input circuits of each of filter and rectifier units 15–18 and since each is tuned to an assigned one of the four frequencies $f_1$–$f_4$, the code bursts are separated out from the composite video signal and from each other. Each time a burst of signal frequency occurs in the coding signal, it is channeled through an assigned one of the code-determining elements 20–23 to a selected one of the input circuits 25–27 of bistable multivibrator 30, depending upon the adjustment of the assigned code-determining element. The coding apparatus at the transmitter comprises an identical arrangement of a bi-stable multivibrator connected to a source of code signal bursts through a series of code-determining switches so that if the switches of the receiver are adjusted in a similar manner as that at the transmitter, the input circuits of bi-stable multivibrator 30 receive pulses similar to those received by the input circuits of the corresponding bi-stable actuating device at the transmitter. Multivibrator 30 therefore produces a rectangularly shaped actuating or deflection-control signal for decoder 12 which is identical in wave form to that developed at the transmitter for coding the television signal initially. It undergoes an amplitude excursion each time the multivibrator is triggered from one of its operating conditions to the other. Decoder 12 consequently operates in synchronism with the coder at the transmitter so that the signal applied to the input circuit of image-reproducing device 13 is suitably compensated to effect intelligible image reproduction.

Consideration will now be given to the manner in which the code-determining elements 20–23 are adjusted in accordance with the switch setting information prescribed for any one given program. Assume that a subscriber wishes to view a particular program. It is contemplated that preceding the commencement of that program and during the first portion thereof, the subscriber will be informed as to the specific cost of such a program either orally by the announcer, visually on the picture, or in any other suitable manner. Assume, for example, that the charge for a typical program will be 75 cents. The subscriber then inserts three quarters in his coin-controlled stepping device 67 to cause movable contact 62 to execute three steps to its operating position corresponding to contact 70. Additionally, in response to depositing the first quarter, switch 82 closes and partially completes the circuit for stepping relay 33.

After depositing the required number of coins, the subscriber operates switches 71 and 76. If source 32 is not conveying any signals to the receiver, or even if it is conveying some of the pulse signals, at the time switch 71 is closed, nothing occurs in the receiver since only frequency-selective relay 72 has a completed circuit and that relay does not respond to the pulse control signals. However, when the next complete group of pulse signals is transmitted to the receiver, the initial "start" signal is supplied to relay 72 through switch 71 to effect actuation thereof. Relay 72, in energizing, moves contact 74 into engagement with fixed contact 73 to apply a positive potential from source 40 to the upper winding of relay 77, causing it to energize and close contacts 79 and 78. The energizing circuit for the lower winding of relay 77 is therefore completed through contacts 79, 78 and switch 76 to the positive terminal of source 40; thus, the relay is maintained or locked in its energized condition so long as the subscriber operates switch 76, even after the termination of the initial "start" signal. Relay 77 when operated also shifts contact 81 into engagement with contact 80 in order to permit stepping relay 33 to respond to the pulse signal. It will be noted that if no money whatsoever has been deposited, switch 82 remains open and relay 33 is rendered ineffective even though contacts 80 and 81 may be closed.

Subsequent to the "start" signal which actuated frequency-selective relay 72, a first pulse control signal is conveyed from source 32 and over contacts 80, 81 to operate relay 33. Since the cost for the particular program considered is 75 cents, this first control signal comprises six pulses, for reasons which will become apparent. Stepping relay 33 is therefore energized six times resulting in the interruption and then application of the positive potential from source 40 on break contact 37 six times effectively to apply six pulses of potential to that break contact. The pulses will occur relatively close together in point of time and thus in response to the first energization of relay 33 and consequent closing of contacts 34 and 35, slow-to-release relay 36 energizes from the potential of source 40 applied thereto over contacts 34 and 35 to connect contact 38 to contact 39 and will maintain that connection throughout the entire series of six pulses. The pulses applied to contact 37 are applied over contacts 38, 39, 41 and 46 to cause corresponding pulsing of stepping relay 52. This relay thus causes movable contact 62 of switch 63 to execute six additional steps from contact 70 to contact 64 which is connected to ground.

Of course, if the cost of the program was more than 75 cents, the first pulse control signal combination employed to step conditioning device 63 would include a number of pulses less than six. For example, if the cost was $1.25 the subscriber would be required to insert five quarters in device 67 and then only four pulses would be applied to relay 33 to effect movement of contact 62 to contact 64.

Meanwhile, at the termination of the first signal pulse train applied to relay 33, contact 34 restores to its break contact 37 resulting in the removal of the energizing potential for slow-to-release relay 36; thus, contact 38 restores to its break contact 43. With the making or closing of contacts 34 and 37, and 38 and 43 a potential from source 40 is applied to stepping relay 44 to effect energization thereof and to cause movable contact 41 to step over to its next position wherein it is connected to stationary contact 47.

With the conditioning device 63 now positioned to contact 64, one side of each of stepping relays 53–56 is grounded. Another or second control signal including a number of pulses from one to three is then developed in source 32 and transmitted to stepping relay 33 by way of contacts 80, 81. Once again relay 36 energizes in response to the first pulse and remains energized throughout the series, if there is more than one pulse, and contact 34 shifts back and forth to apply pulses of potential from source 40 over contacts 37, 38, 39 and 41. Since stepping switch 42 is now positioned so that contact 47 is connected to 41, the pulse or pulses are applied to stepping relay 53 to effect actuation of code-determining element 20 to a position corresponding to the number of pulses. Thus, at the termination of the second series of pulses, switch 20 has been positioned such that $f_1$ filter and rectifier unit 15 is connected to a selected one of output circuits 25–27 as dictated by the number of pulses received from the transmitter.

Upon the completion of the second control signal, relay 33 de-energizes resulting in the de-energization of relay 36 and the application of voltage from source 40 over contacts 34, 37, 38 and 43 to stepping relay 44. Switch 42 is then actuated one step so that movable contact 41 is connected to stationary contact 48. When a third series of from one to three pulses comprising a third control signal is now transmitted from source 32 to relay 33, pulses of potential from source 40 are again applied to contact 37 but at this time will be applied over contacts 38, 39 and 41 to contact 48 to cause pulsing of relay 54 and consequently step-by-step operation of switch 21. Upon termination of the third control signal code-determining device 21 has therefore been positioned to connect unit 16 to the proper input circuit of bi-stable multivibrator 30.

A fourth and a fifth control signal will then be transmitted to the receiver to cause pulsing of relay 33. In like manner, stepping switch 42 causes such signals to be applied respectively to relays 55 and 56 to cause actuation of switches 22 and 23 respectively. Thus, upon the termination of the five control signals all of the code-determining elements are positioned as required and bi-stable multivibrator 30 responds properly to the code signal bursts in order to successfully decode the picture.

At the end of the fifth control signal, contact 34 once again falls back to contact 37 and contact 38 restores to establish a connection with contact 43, resulting in the application of potential from source 40 to stepping relay 44. Wiper 41 is thus stepped over to contact 51 so that the "reset" pulse, which follows the fifth control signal, effects actuation of reset magnet 61 by way of contact 51 to cause restoration of wiper contact 62 of switch 63 back to its home or reference position and to open switch 82. Resetting is achieved at this time to prevent a person, bent on fraud, from causing movable contact 62 to respond to control signals of more than one group to reach contact 64 by prolonged actuation of switches 71 and 76.

As mentioned hereinbefore, the transmitter disclosed in the aforementioned Bridges application transmits six different frequencies. It should now be apparent that all six frequencies may be utilized merely by employing two additional filters and rectifiers, two additional stepping relays like 53–56 and two additional switches like 20–23, all wired in like manner. Additionally stepping switch 42 would also require two additional operating positions.

Of course, provision must be made to "home" each one of the various switches, with the exception of switch 63 which has already been homed, to their respective reference positions as shown in the drawing. However, such homing equipment may be entirely conventional and has not been shown to avoid complicating the drawing. For example, an additional relay may be employed for each stepping switch, controlled by a signal transmitted from the transmitter at the conclusion of the subscription program, which when operated actuates the switch to its home position. Alternately, a manual adjustment may be provided which permits the subscriber himself to manually adjust each switch to its home position.

If it is desired to operate the system on a credit rather than cash basis, the subscriber may be provided with a large number of quarter-size slugs, free of charge. Each time he wishes to view a subscription program, he deposits the required number of slugs in his coin box. At the conclusion of each month or so, the coin box is opened by the operating company, the slugs are counted, and the subscriber billed according to the number of slugs used.

By way of summary, the present invention provides a code-determining arrangement for a subscription television receiver. It comprises a series of adjustable code-determining elements 20–23 individually having a plurality of operating positions and collectively representing a code schedule in accordance with their relative positions with respect to one another. An actuating mechanism (relays 53–56, stepping switch 42, and relay 44) is provided which has an effective condition (namely, when the common terminals of relays 53–56 are connected to contact 64 and thus to ground) and an ineffective condition for selectively adjusting, when in its effective condition, any of code-determining elements 20–23 to any selected one of its operating positions. A conditioning device 63 has a plurality of operating positions and conjointly responds to the registration of at least two different bits of information so related to one another that the conditioning device assumes a preselected one of its operating positions (namely, its last position wherein movable contact 62 is connected to contact 64) in which it establishes the actuating mechanism in the effective condition. Coin-controlled stepping device 67 constitutes means responsive to the depositing of a predetermined number of coins for registering one of the bits of information on the conditioning device, and stepping relay 52 constitutes means responsive to a control signal for registering another of the bits of information on the conditioning device.

While a particular embodiment of the invention has been shown and described, modifications may be made, and it is intended in the appended claims to cover all such modifications as may fall within the true spirit and scope of the invention.

I claim:

1. A code-determining arrangement for a subscription television receiver comprising: a series of adjustable code-determining elements individually having a plurality of operating positions and collectively representing a code schedule in accordance with their respective positions; an actuating mechanism including a series of normally ineffective stepping relays each of which controls the positioning of an assigned one of said code-determining elements; a signal source coupled to said stepping relays for providing a series of control signals selected ones of which represent a predetermined operating position of respective ones of said adjustable code-determining elements; a conditioning device for said actuating mechanism having a plurality of operating positions and conjointly responsive to the registration of at least two different items of information so related to one another that said conditioning device assumes a preselected one of its operating conditions in which it completes circuit means to render said stepping relays effective to permit said relays to respond to said control signals; and a plurality of means for individually registering an assigned one of said items of information on said conditioning device.

2. A code-determining arrangement for a subscription television receiver comprising: a series of adjustable code-determining elements individually having a plurality of operating positions and collectively representing a code schedule in accordance with their respective positions; an actuating mechanism including a series of stepping relays individually having an effective condition and an ineffective condition and normally in its ineffective condition, each of said relays controlling the positioning of an assigned one of said code-determining elements, and also including a stepping arrangement for effecting sequential operation of said stepping relays when in their effective conditions; a signal source coupled to said stepping relays for providing a series of control signals selected ones of which represent a predetermined operating position of respective ones of said adjustable code-determining elements; a conditioning device having a plurality of operating positions and conjointly responsive to the registration of at least two different items of information so related to one another that said conditioning device assumes a preselected one of its operating positions in which it completes circuit means to render said stepping relays effective to permit said relays to respond one at a time to said control signals under the control of said stepping arrangement; and a plurality of means for individually registering an assigned one of said items of information on said conditioning device.

3. A code-determining arrangement for a subscription television receiver comprising: a series of adjustable code-determining elements individually having a plurality of operating positions and collectively representing a code schedule in accordance with their respective positions; a signal responsive actuating mechanism having an ineffective condition and including an incompleted control circuit which when completed places said mechanism in an effective condition for selectively adjusting any of said code-determining elements to any selected one of its operating positions responsive to predetermined signals; a multi-position conditioning device including a stepping switch and conjointly responsive to the registration of at least two different items of information so related to one another that said conditioning device steps over to a preselected one of its operating conditions to effect completion of said control circuit to permit the adjustment of each of said code-determining elements; and a plurality of means for individually registering an assigned one of said items of information on said conditioning device.

4. A code-determining arrangement for a subscription television receiver comprising: a series of adjustable code-determining elements individually having a plurality of operating positions and collectively representing a code schedule in accordance with their respective positions; an actuating mechanism having an ineffective condition and including an incompleted control circuit which when completed places said mechanism in an effective condition for selectively adjusting any one of said code-determining elements in any selected one of its operating positions; a multi-position conditioning device including a stepping switch and conjointly responsive to the registration of two items of information so related to one another that said conditioning device steps over to a preselected one of its operating conditions to effect completion of said control circuit to permit the adjustment of each of said code-determining elements; means responsive to the depositing of a predetermined number of coins for stepping said stepping switch to an intermediate position to register one of said items of information on said conditioning device; a signal source; and means coupled to said source and responsive to an applied signal therefrom for stepping said stepping switch from said intermediate position to said preselected position for registering the other of said items of information on said conditioning device.

5. A code-determining arrangement for a subscription television receiver comprising: a plurality of input circuits; a plurality of output circuits; a series of adjustable multi-position switches connected to said input circuits and to said output circuits, each of said switches in each position establishing a predetermined circuit connection between an assigned one of said input circuits and a selected one of said output circuits; an actuating mechanism including a series of stepping relays individually normally established in an ineffective condition and including an incompleted control circuit which when completed renders each of said stepping relays effective for selectively adjusting each of said switches to any selected one of its operating positions; a multi-position conditioning device including a stepping switch and conjointly responsive to the registration of two different items of information so related to one another that said conditioning device steps over to a preselected one of its operating conditions to effect completion of said control circuit to permit the adjustment of each of said switches; means responsive to the depositing of a predetermined number of coins for stepping said stepping switch to an intermediate position to register one of said items of information on said conditioning device; a pulse signal source; and means coupled to said source and responsive to an applied pulse signal therefrom for stepping said stepping switch from said intermediate position to said preselected position for registering another of said items of information on said conditioning device.

References Cited in the file of this patent

UNITED STATES PATENTS

| | | |
|---|---|---|
| 2,116,372 | Weld | May 3, 1938 |
| 2,409,229 | Smith et al. | Oct. 15, 1946 |
| 2,557,581 | Triman | June 19, 1951 |
| 2,731,620 | Gottfried | Jan. 17, 1956 |
| 2,740,106 | Phelps | Mar. 27, 1956 |